(12) United States Patent
Agronow

(10) Patent No.: US 8,032,302 B1
(45) Date of Patent: Oct. 4, 2011

(54) METHOD AND SYSTEM OF MODIFYING WEATHER CONTENT

(75) Inventor: Daniel Scot Agronow, Douglasville, GA (US)

(73) Assignee: Strategic Design Federation W, Inc. (VG)

( * ) Notice: Subject to any disclaimer, the term of this patent is extended or adjusted under 35 U.S.C. 154(b) by 643 days.

(21) Appl. No.: 11/619,077

(22) Filed: Jan. 2, 2007

(51) Int. Cl.
*G01W 1/10* (2006.01)
*G06F 19/00* (2006.01)

(52) U.S. Cl. .............................. 702/3; 702/2; 705/14.52

(58) Field of Classification Search ................. 702/2, 3, 702/34
See application file for complete search history.

(56) References Cited

U.S. PATENT DOCUMENTS

| | | | | |
|---|---|---|---|---|
| 5,528,494 A * | 6/1996 | Moses | ............................... | 702/4 |
| 5,809,491 A * | 9/1998 | Kayalioglu et al. | ............ | 706/45 |
| 6,255,953 B1 * | 7/2001 | Barber | ........................... | 340/601 |
| 6,735,630 B1 * | 5/2004 | Gelvin et al. | .................. | 709/224 |
| 2002/0130899 A1 * | 9/2002 | Ryan et al. | ..................... | 345/738 |
| 2006/0106540 A1 * | 5/2006 | Campbell | .......................... | 702/4 |
| 2006/0112148 A1 * | 5/2006 | Jennings et al. | .............. | 707/201 |
| 2008/0059508 A1 * | 3/2008 | Lu et al. | ........................ | 707/102 |
| 2008/0096531 A1 * | 4/2008 | McQuaide et al. | ........ | 455/412.1 |

* cited by examiner

*Primary Examiner* — Hal Wachsman
(74) *Attorney, Agent, or Firm* — Carlineo, Spicer & Kee, LLC

(57) ABSTRACT

A computer-implemented method of identifying weather events in geographic regions of interest includes monitoring queries to a weather information system. The queries contain at least one field indicative of a geographic region of interest. A signal indicative of the presence of a weather event in the geographic region of interest is generated when the number of queries pertaining to the geographic region of interest is above the statistically determined value.

22 Claims, 7 Drawing Sheets

THRESHOLD INFORMATION FOR ZIP CODE 18901 ON JULY 11

| Time Frame | Expected Number of Queries | Allowed Deviation |
|---|---|---|
| 12:00 am – 1:00 am | 600 | 204 |
| 1:00 am – 2:00 am | 550 | 188 |
| 2:00 am – 3:00 am | 500 | 171 |
| 3:00 am – 4:00 am | 400 | 136 |
| 4:00 am – 5:00 am | 750 | 75 |
| 5:00 am – 6:00 am | 1000 | 256 |
| 6:00 am – 7:00 am | 1100 | 375 |
| 7:00 am – 8:00 am | 1350 | 460 |
| 8:00 am – 9:00 am | 1500 | 512 |
| 9:00 am – 10:00 am | 1800 | 614 |
| 10:00 am – 11:00 am | 1650 | 563 |
| 11:00 am – 12:00 pm | 1500 | 512 |
| 12:00 am – 1:00 pm | 1650 | 563 |
| 1:00 pm – 2:00 pm | 1800 | 614 |
| 2:00 pm – 3:00 pm | 1900 | 648 |
| 3:00 pm – 4:00 pm | 1950 | 665 |
| 4:00 pm – 5:00 pm | 1350 | 460 |
| 5:00 pm – 6:00 pm | 1250 | 426 |
| 6:00 pm – 7:00 pm | 1100 | 375 |
| 7:00 pm – 8:00 pm | 900 | 307 |
| 8:00 pm – 9:00 pm | 800 | 273 |
| 9:00 pm – 10:00 pm | 700 | 239 |
| 10:00 pm – 11:00 pm | 650 | 222 |
| 11:00 pm – 12:00 pm | 600 | 204 |

Column labels: 502, 504, 506

*Fig. 4*

METHOD AND SYSTEM OF MODIFYING WEATHER CONTENT

CROSS REFERENCE TO RELATED APPLICATIONS

This application is related to co-pending U.S. patent application Ser. No. 11/619,069, filed Jan. 2, 2007, entitled Weather Determination System.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings:

FIG. 4 is a table of example statistical data in accordance with the weather determination system of FIG. 1;

DETAILED DESCRIPTION

Figure 1:
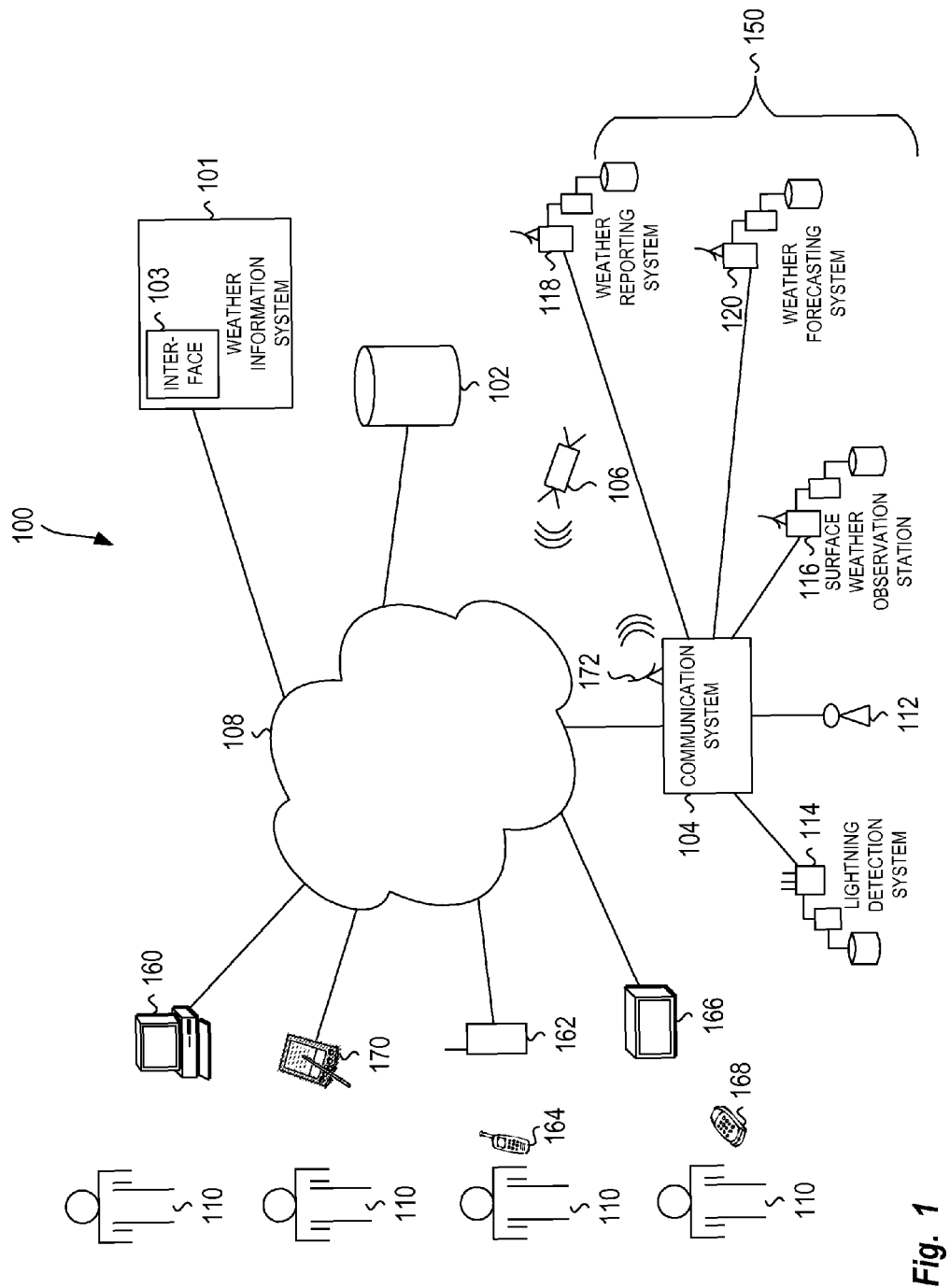
FIG. 1 is a system diagram in accordance with one embodiment of a weather determination system.

Certain terminology is used herein for convenience only and is not to be taken as a limitation on the embodiments of the present invention. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the weather determination system and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

Referring to FIG. 1, a weather determination system 100 for locating and determining the existence of weather events is shown. The weather determination system 100 obtains queries from users 110 and collects statistics corresponding to those queries to determine the existence of a weather event. The users 110 may be individuals, companies, networks or other entities who request weather information through a weather information system 101. A weather event can be a thunderstorm, an ice storm, a wind storm, a tornado or any other generally identifiable weather system or area of weather activity. Queries are submitted by the users 110 to the weather information system 101 through a network 108 to obtain current, historical or forecasted weather information (e.g., temperature, wind data, radar information, storm data, etc.) for a desired geographic region, location or area. The queries submitted by the users 110 include a zip code, a city name, a region or some other indicia identifying the desired geographic region for which weather information is sought. The queries may be sent to the weather information system 101 from any device capable of sending a request for weather information such as a computer 160, a workstation, a personal digital assistant 170, telephone 164 or a television 166 including information input via a television remote control 168. The telephone 164 connects to the network 108 through the telephone node 162. The network 108 may be the Internet, a local intranet, a direct connection or any other network capable of facilitating communication between users 110 and the weather information system 101.

The weather information system 101 is any system, apparatus, application or network that provides current, historical or forecasted weather information or data relevant to a particular geographic location or region to a user. Examples of such weather information systems include a weather website, weather database, telephone system, text messaging system, television broadcast, radio broadcast, weather service or some other similar system. Such systems are generally known in the art, and a detailed discussion of the features of such weather systems are omitted here for convenience only and should not be considered limiting. The weather information system 101 includes an interface 103 that enables the users 110 to interact with the weather information system 101, including receiving queries from a user or entity and communicating the requested weather information to the users 110. The interface 103 can be any system, application or apparatus capable of receiving input from users 110 and/or providing information to the users 110. For example, the interface 103 may be a webpage with the capability of having users 110 submit queries over the Internet. In alternative embodiments the interface 103 is the front end of an automated phone system or some similar system which receives input from users.

The weather determination system 100 includes an information management module 102 that collects, compiles, observes and processes information related to the weather determination system 100, including query data, statistical data, statistical analysis, weather data and other information. The information management module 102 monitors the number of queries being received by the weather information system 101 from users 110. The information management module 102 communicates with the other components of the weather determination system 100 through the network 108 to collect and compile the queries sent from the users 110 to the weather information system 101. The information management module 102 processes the query data and stores queries and statistics related to the queries of the geographic region requested by the users 110. The information management module 102 uses the statistics to create statistically relevant values pertaining to the number of queries the weather information system 101 actually receives or expects to receive over any given time period for a particular geographic region or location. The information management module 102 further determines a statistically relevant value for representing the number of queries that must be received for a particular geographic region to suggest the presence of a weather event in, around or otherwise corresponding to that geographic area. In one embodiment the calculations and processing are accomplished exclusively using the information management module 102. In alternate embodiments the above described process is accomplished in conjunction with the weather information system 101. If, at any point, the number of queries exceeds the statistically relevant value, the information management module 102 determines that there is a high probability of a weather event within, near, around or in proximity to the geographic region or location for which the queries were received. The data maintained by the information management module 102 and the statistics generated by the information management module 102 are updated as additional queries are received from the users 110.

As shown in FIG. 1, the information management module 102 is independent from the weather information system 101. In alternate embodiments the information management module may be is either partially or completely integrated (e.g., a server hosting a website) with the weather information system 101. The information management module 102 may be implemented as a single component such as a server or a computer or may alternatively be implemented as several different components, such as a hard disk drive connected to a communication system or a series of computers. The information management module 102 maintains the query data in a database or other data structure on an electronic medium, such as a hard disk drive connected to or part of the information management module 102. The database can be a relational database, a flat file database, an object oriented database or any other database capable of maintaining large amounts of information. The connections between the weather information system 101, the information management module 102 and the other devices may vary depending on the implementation as will be recognized by those skilled in the art. The weather information system 101 and the information management module 102 can connect to the network 108 through a dedicated T1 line, a digital subscriber line, a cable modem or any other means capable of handling the needed bandwidth.

The weather determination system 100 includes a communication system 104 that communicates with one or more weather devices 150. The weather devices 150 are capable of obtaining current, analyzed, historic, future and/or forecast weather data including weather data relevant to a geographic area specified by the weather management module 102. As shown in FIG. 1, the weather devices 150 include a weather satellite 106, a radar system 112, a lightning detection system 114, a surface weather observation station 116, a weather reporting system 116 and a weather forecasting system 120. In general, the weather devices 150 include any device capable of sending, collecting, observing, retrieving and/or analyzing raw, analyzed, historic or forecast weather data to communication system 104. The information received from the weather devices 150 can be raw data such as satellite imagery or it can be partially processed data, such as radar data which has been interpreted by the radar system 112 or previously analyzed by human interaction.

The communication system 104 communicates with the weather devices 150 to determine the weather conditions in the geographic region that is of interest as a result of the processing done by the weather management module 102 concerning the statistically relevant value being exceeded. That is, once the statistically relevant value for a geographic region has been exceeded, the communication system 104 communicates the appropriate geographic region of interest to the weather devices 150. The weather devices 150 obtain the relevant weather data or analysis and communicate the weather data for that geographic region back to the communication system 104. In one embodiment, the communication system 104 communicates with all available weather devices 150 to receive information on a geographic area. In alternate embodiments any number or subset of the available weather devices 150 are used to provide the weather detection system 100 with weather data. The determination of which of the weather devices 150 the communication system 104 will communicate with is determined based on input from an administrator of the system, a default setting of the weather determination system 100 or some other process. For example, depending on the timing of the weather data received and the geographic region, the weather detection system 100 may request data from the radar system 112 and the lightening detection system 114. The weather detection system 100 then processes the information received from the weather devices 150. In one embodiment, the information management system 102 processes and analyzes the data received from the weather devices 150 and determines if a relevant weather event has occurred, is occurring or will shortly occur in, around or near the geographic area. In an alternate embodiment, an individual observes and/or analyzes the weather data received from the weather devices 150 to determine the existence or non-existence of a weather event.

In an example of the above described embodiment, a plurality of users 110 submit queries from a variety of user devices to the weather information system 101 through the interface 103. The geographic region can be defined as a single zip code, several zip codes or another non-zip code defined area. The users 110 may be all physically located in or near the geographic region or may be geographically dispersed. In the event of a changing weather event or other weather event in a geographic area, the number users 110 submitting queries tend to rise as more of the users 110 develop an interest in the weather event. For example, if a sudden thunderstorm approaches, individuals may be interested in the future and current weather in the region. If the number of users 110 raises to above the pre-determined statistically relevant number of queries for that region, the information management module 102, in conjunction with the communication system 104 and weather devices 150, determines the weather in the geographic region. The weather determination system 100 then will broadcast the newly found weather information to the users 110 and other individuals watching, listening or reading broadcast information.

In an alternate embodiment, the weather determination system 100 receives input from users 110 in the form of broadcast tuning data. For example, the users 110 are individuals watching television through a system capable of monitoring real-time tuning information. The weather determination system 100 monitors the number of users 110 watching weather programming and the amount of time users 110 spend watching weather programming. By developing statistics on this information the weather determination system 100 can perform the same analysis on the tuning data as it can on the query data. Rather than monitoring the number of queries, in this embodiment, the weather determination system 100 monitors tuning data to develop the expected value and the allowed deviation as a function of the number of users 110 watching a weather channel and the amount of time the users 110 spend watching the channel. The geographic region used for developing the statistical information is the geographic location of users 110 when they are watching television.

Figure 3:
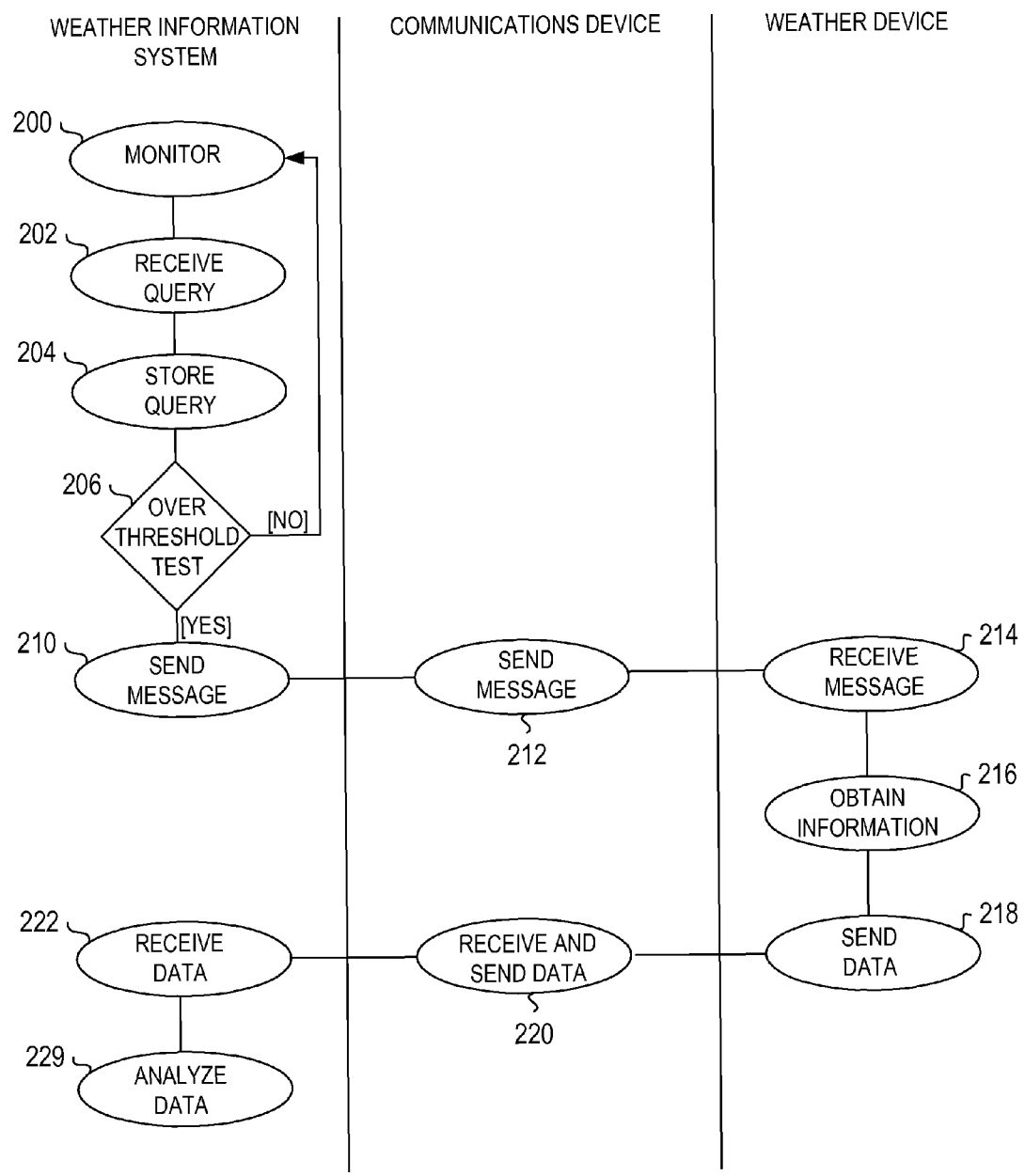
FIG. 3 is an activity diagram of an embodiment of the weather determination system FIG. 1.

FIG. 3 is an activity diagram for determining a weather event using the weather determination system 100. As illustrated in FIG. 3, the weather information system 101 monitors incoming queries at the monitor step 200. The information management module 102 monitors incoming queries to determine if queries made with respect to a geographic region surpass the predetermined statistically relevant value, while also maintaining records of incoming queries for that region to reevaluate and recalculate the statistically relevant value for a given geographic area. The receive query step 202 receives and processes a query by evaluating the information contained in the query and determining which geographic area is associated with the query. In one embodiment, the determination is made by parsing out a zip code, city name or other geographic indicia from the query and using that information to determine the desired geographic area. The store query step 204 stores the query to both determine whether the statistically relevant value has been exceeded and to calculate the value for future use. The weather determination system 100 continually updates the statistically determined value to maintain high accuracy in determining weather events. The information management module 102 determines whether the threshold has been reached and records queries and the associated geographic areas. The weather determination system 100 is capable of determining if the recent number of queries is greater than the predetermined statistical value. Separately, the weather determination system 100 records of all queries to geographic areas and performs statistical analysis on this data to determine the statistically relevant value used in the above determination process. Based on the number of queries and the time and date of the queries, the weather determination system 100 determines a normalized value of expected queries over any period of time performed using any well known algorithm.

The threshold test step 206 determines if the most recent query is over the predetermined statistically determined value. If queries associated with the current geographic area are not over the predetermined value, the weather determination system 100 continues monitoring at the monitor step 200. If queries associated with the current geographic area are over the predetermined value, a message containing the geographic region is sent to the communication system 104 at the send message step 210. The communication system 104 sends this message to one or more of the weather devices 150 at the send message step 212 which is received by the weather device at the receive message step 214. The weather device refers to any weather device used to determine the actual or forecasted weather in a geographic area. The weather device then obtains current and future weather information on the desired geographic region at the obtain information step 216. The weather device sends information regarding the queried geographic region to the information management module 102 at the send data step 218 and the receive and send data step 220. The weather data is received at the information management module 102 at receive data step 222. The information management module 102 analyzes this data to determine if a weather event is occurring or is likely to occur. In one embodiment the analyze data step 224 uses an automated algorithm to interpret the weather device data and determine if a weather event has occurred. In an alternate embodiment the analyze data step 224 is a process involving a meteorologist or other weather personnel analyzing the data and making a determination as to the existence of a weather event.

Once the weather determination system 100 has determined the existence of a weather event, broadcast information is altered to reflect the identified weather event. Broadcast information included with weather data is received by the users 110 or by other individuals interested in weather information in a variety of manners including a television broadcast, a radio broadcast, a webpage update, an email sent to a subscriber, a text message sent to a mobile device or any other manner that an individual can receive weather information. In one embodiment, the weather determination system 100 is used to produce broadcast information pertaining to geographic regions where no broadcast information was previously available or maintained. In alternate embodiments, the weather determination system 100 is used to update or supplement pre-existing broadcast information pertaining to the geographic area. In one embodiment, the weather determination system 100 creates broadcast information pertaining to the geographic areas automatically by using the data received from weather devices 150 and generating broadcast information from that data. In an alternate embodiment, an individual organizes or otherwise creates the broadcast information and prepares the information for broadcast.

In one embodiment of the weather determination system 100, a user's webpage is altered to reflect the results of the weather determination. The user's webpage may be a portal webpage with weather and non-weather information or a webpage dedicated entirely to weather events. When a geographic area has a new weather event, as determined by the weather determination system, the weather determination system will update the page with this weather event. In one embodiment, the user selects particular geographic areas of interest and only weather events in these areas will be shown on the user's webpage.

Figure 7:
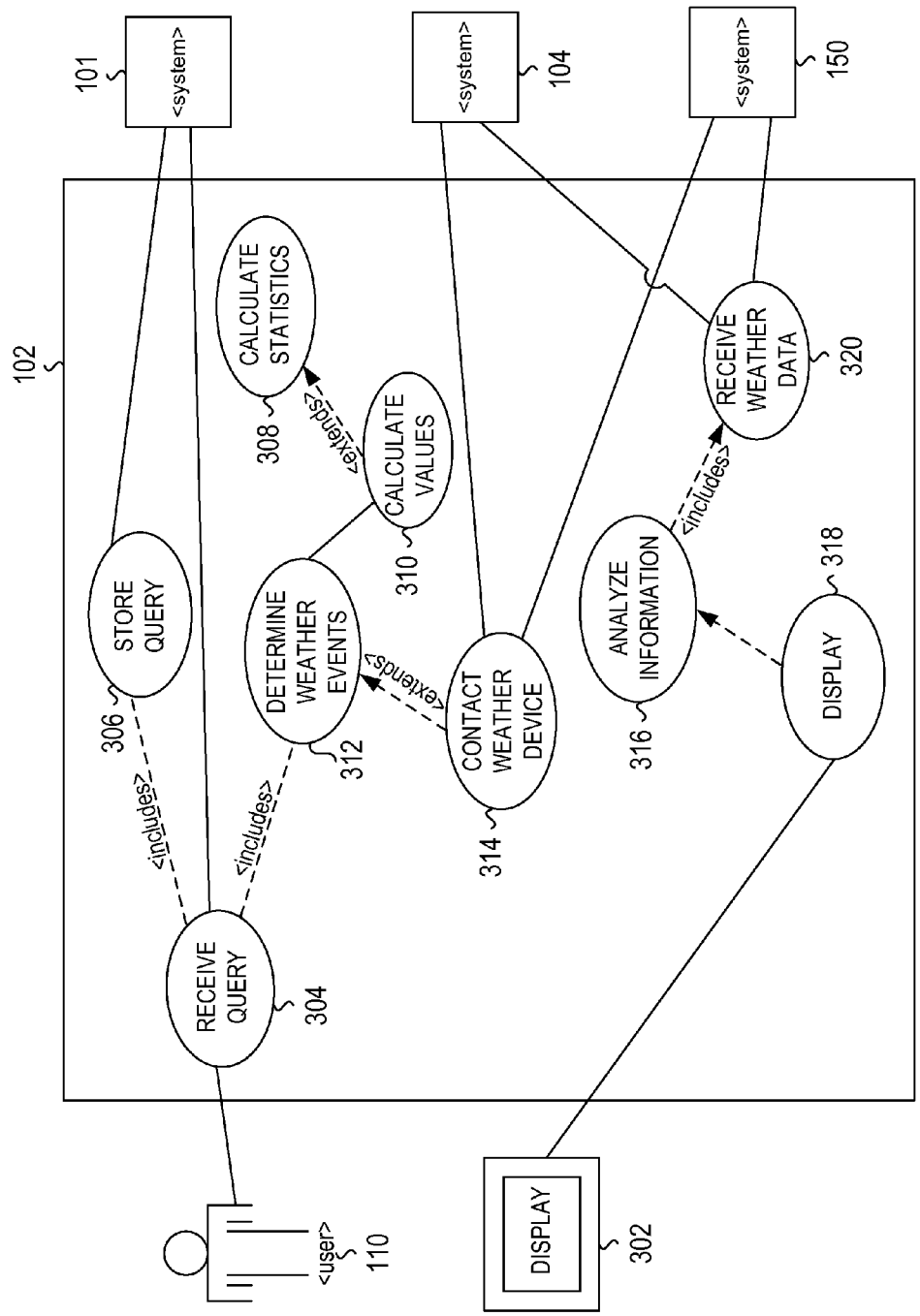
FIG. 7 is a use case diagram in accordance with the weather determination system of FIG. 1.

FIG. 7 is a use case diagram of the weather detection system 100. Users 110 submit queries which are received by the information management module 102 at the receive query use case 304. The receive query use case 304 includes the store query use case 306 which stores the query and determines the geographic region associated with the query. The receive query use case 304 and the store query use case 306 interact with the interface 101 to receive and store the queries. The calculate statistics use case 308 maintains and calculates statistics from the queries submitted by users 110 which have been stored by the information management module 102. The calculate values use case 310 uses the statistics created by the calculate statistics use case 308 to determine the expected number of queries in a geographic region and the allowed deviation values as described above. The determine weather events use case 312 is used when a query is received and, using the values which were calculated by the calculate values use case 310, determines if the number of queries is above the expected value by enough to indicate the presence of a weather event. If the determine weather events use case 312 determines the probability of a weather event, the contact weather device use case 314, utilizing the communication system 104, contacts the weather device 150 to receive weather information in the desired geographic region at the receive weather data use case 320. The receive weather data use case 320 includes the analyze information use case 316, which analyzes the data collected from the weather device 150 to determine the weather conditions in the relevant geographic area. In an alternate embodiment the process of analyzing the information received from the weather device 150 is accomplished with the assistance of weather personnel (e.g. individuals working in the weather information industry). The display use case 318 formats and displays the weather event information received from weather device 150 on the display 302, if the analyze information use case 316 has determined the existence of a weather event.

FIG. 4 illustrates example statistical query information and the statistically determined values necessary for determining weather events. The time frame column 502 describes the time frames used to determine the expected number of queries and the allowed deviation from those values. In the example of FIG. 4, query data is measured on an hourly basis. However in alternative embodiments this value can be shorter, longer or continuous. The expected number of queries column 504 lists the number of queries that the weather determination system has determined as the expected value for a given time period. This value is determined by monitoring the number of queries in geographic regions over an extended period of time at a similar time of year, season and time of day in that geographic region. As queries are received this value is updated and can be altered by the weather determination system or by an administrator of the system. The allowed deviation column 506 lists the statistically determined deviation allowed from the expected value before the weather determination system determines that a weather event is likely. For example, if between the hours of 1:00 pm and 2:00 pm the number of queries needed to indicate the likelihood of a weather event is 2414 queries (the 1800 expected queries added to the 614 queries allowed in deviation from the expected number of queries). If the number of queries the weather determination system 100 receives between 1:00 pm and 2:00 pm exceeds 2414 queries, the system has determined a high likelihood of a weather event. If, in another example, the weather determination system 100 is operating between the hours of 12:00 am and 1:00 am the number of queries needed to indicate a high likelihood of a weather event is 804 queries (the 600 expected queries added to the 204 queries allowed in deviation). If, during this time period, the weather detection system 100 receives 500 queries the weather detection system has determined that there is not a high likelihood of a weather event. In this scenario the weather detection system 100 will continue to monitor incoming queries and update the statistics; however it will not begin the communication to determine the actual weather in the geographic region.

Figure 5:
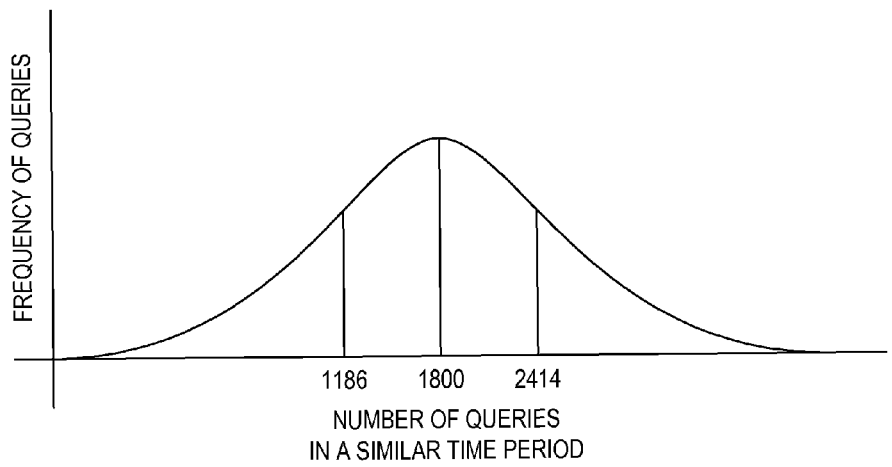
FIG. 5 is a graph of example statistical data in accordance with the weather determination system of FIG. 1.

FIG. 5 illustrates an example graph of queries for a specific period of time as well as a standard deviation for this data assuming one standard deviation for the time period from 1:00 pm-2:00 pm as illustrated in the table of FIG. 4. The x-axis of the graph shows the number of queries for similar time periods and seasons as described above and the y-axis of the graph shows the frequency of those queries over an extended period of time. As the information management module 102 monitors the received queries over time it generates these statistics. Using these statistics the information management module 102 is able to generate the expected number of queries during similar time periods, whether they are based on time of year or time of day. By plotting the number of queries the information management module 102 determines the expected number of queries; in the example in FIG. 5 this value is 1800 queries.

Once the expected value is determined the weather determination system 100 determines the allowed deviation based on the statistics. The allowed deviation and the calculation used to determine this deviation may alter if a determination is made by the administrator of the system that the current calculation is either determining non-existence weather events by having an allowed deviation that is too low, or alternatively missing weather events by having an allowed deviation that is too high. In the example illustrated by FIG. 5, the calculation is one standard deviation assuming a normal distribution. As a full set of statistics is developed and the calculation is altered by the administrator a more accurate determination process is developed.

Figure 2:
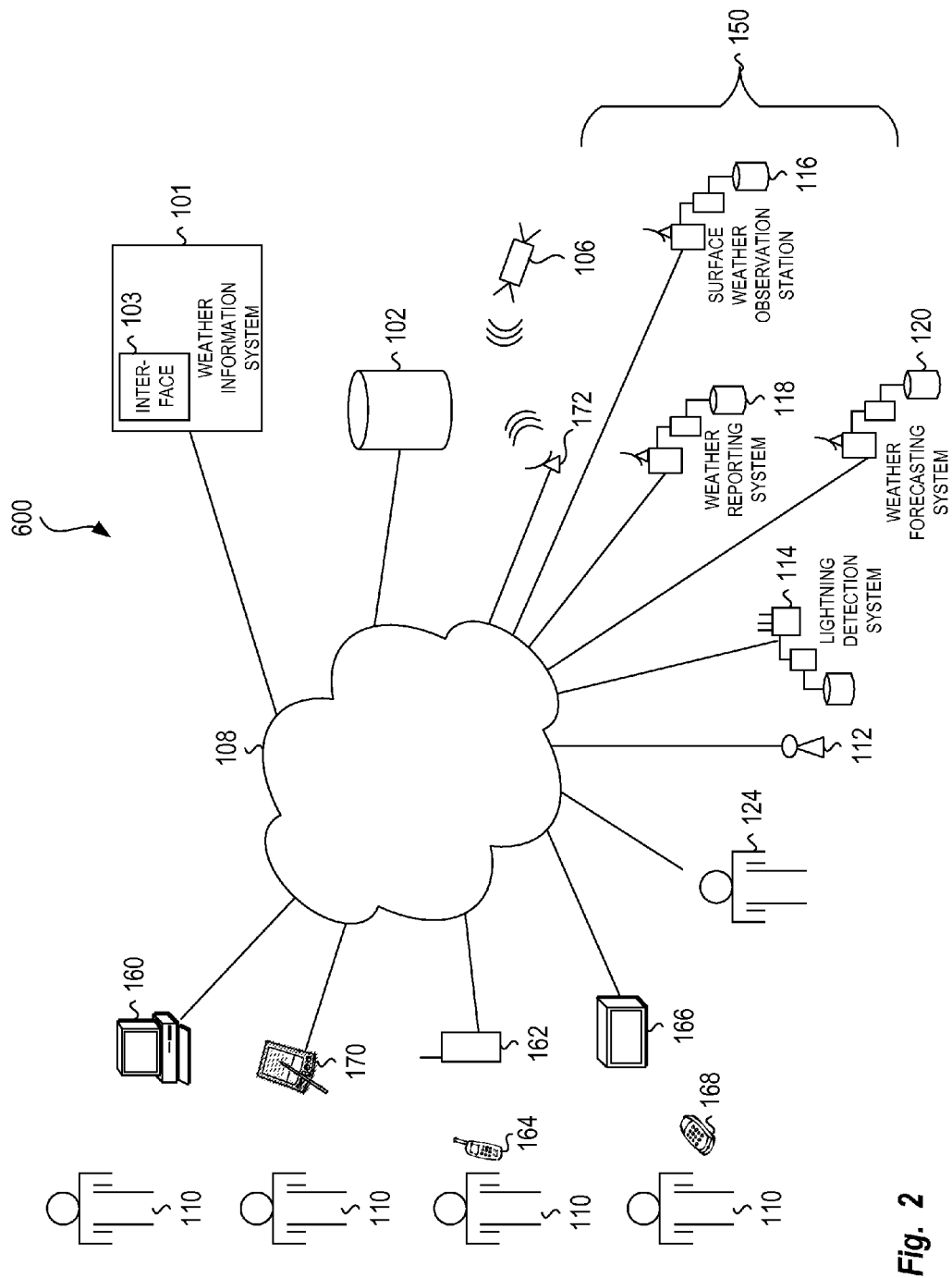
FIG. 2 is a system diagram in accordance with a second embodiment of a weather determination system.

Referring to FIG. 2, in an alternate embodiment, the weather determination system 600 includes many of the same components and features as described above with respect to the weather determination system 100 of FIG. 1. In FIG. 2, users 110 submit queries to the interface 103 of the weather information system 101 via the network 108. The weather determination system 600 also maintains the query information, statistical information and determines the likelihood of a weather event in a similar way that the weather determination system 100 does in the embodiment illustrated in FIG. 1. When a determination of the likelihood of a weather event is completed, the weather information system 600 outputs this information to an administrator 124 for evaluation. The administrator 124 facilitates communications with the weather devices 150 by communicating the geographic region of interest to the weather devices 150 including communicating with the radar system 112, the surface weather observation station 116, the lightning detection system 114, the weather reporting system 118, the weather forecasting system 120 and the weather satellite 106 through the satellite dish 172. The administrator 124 observes and/or analyzes the output weather data communicated from the weather devices and makes a decision on the existence and severity of the weather conditions in the geographic area. The administrator 124 also prepares broadcast information for altering a weather broadcast based on the information received from the weather devices 150.

Figure 6:
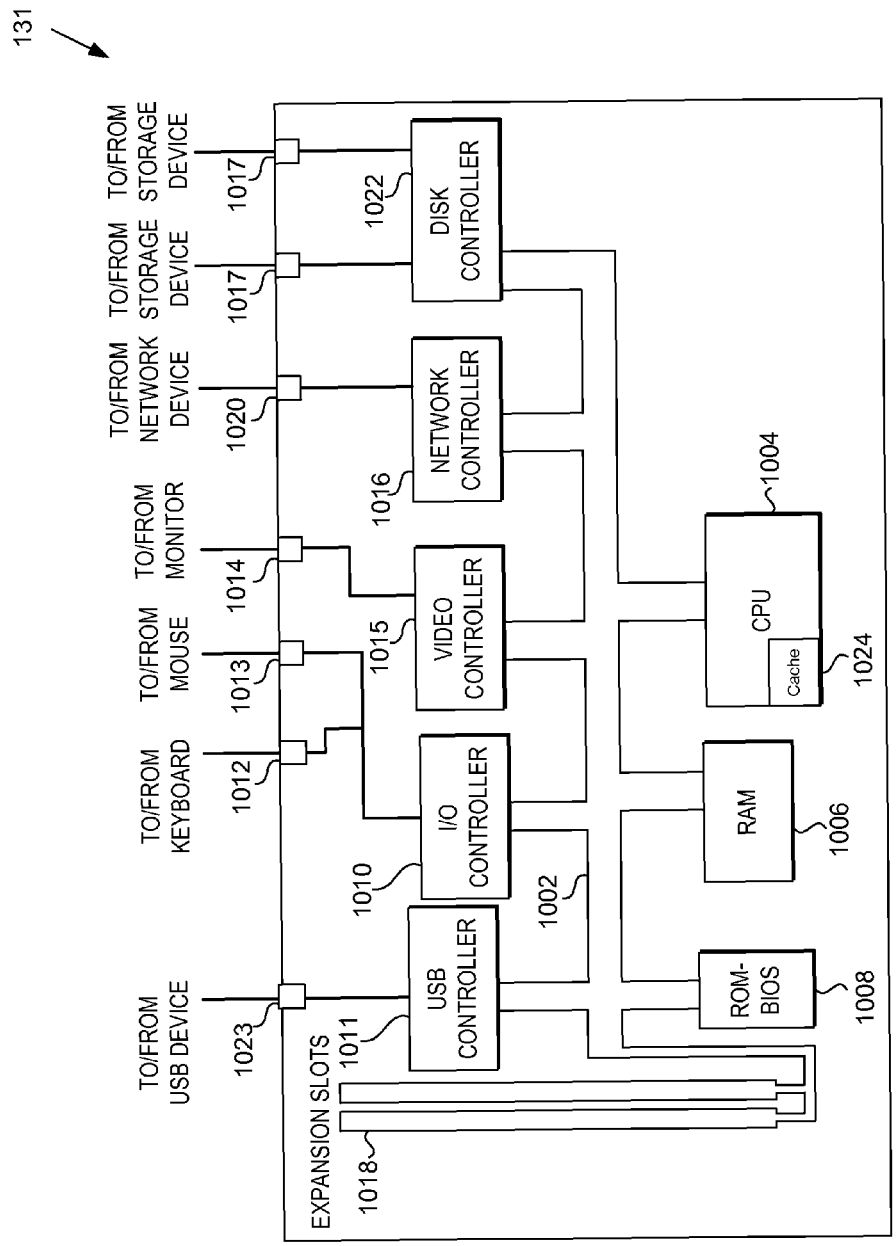
FIG. 6 is an illustration of a computer system on which the weather determination system can be realized.

FIG. 6 illustrates a block diagram of a computer 131 through which the embodiments of the present invention may be implemented. A system bus 1002 transports data amongst the Central Processing Unit (CPU) 1004, RAM 1006, the Read Only Memory Basic Input Output System (ROM-BIOS) 1008 and other components. The CPU 1004 can contain a cache memory component 1024. The computer 131 may include one or more external storage ports 1017 for accessing a hard disk drive, optical storage drive (e.g., CD-ROM, DVD), flash memory, tape device or other storage device (not shown). The relevant storage device(s) are connected through the external storage port 1017 which is connected to the system bus 1002 via a disk controller 1022. A keyboard and mouse (not shown) can be connected to the keyboard port 1012 and mouse port 1013, respectively, which are connected to the system bus 1002 through the I/O controller 1010. A monitor (not shown) can be connected to a monitor port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. Additional ports, such as parallel or serial ports (not shown), may be utilized through the I/O controller 1010. The computer 131 may include one or more USB ports 1023. A USB device (not shown), including but not limited to a printer, scanner, keyboard, mouse, digital camera, storage device, PDA and webcam, can be connected to the USB port 1023 which is connected to the system bus 1002 through the USB controller 1011. Expansion slots 1018 can be comprised of Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer 131. These slots can be used to connect network cards, video cards, sound cards, modems and any other peripheral devices generally used with a computer. Detailed descriptions of these devices have been omitted for convenience only and should not be construed as limiting.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

I claim:

1. A computer implemented method comprising:
   (a) monitoring current queries to an Internet-based weather information system, wherein the queries contain at least a request for weather information pertaining to a geographic region of interest;
   (b) determining a query threshold for the geographic region of interest, wherein the query threshold represents a statistically determined number of queries, the receipt of which is indicative of the presence of a weather event;
   (c) determining if the number of monitored queries pertaining to the geographic region of interest is above the query threshold;
   (d) inferring the presence of the weather event in the geographic region of interest if the number of monitored queries pertaining to the geographic region of interest is above the query threshold; and
   (e) generating a signal indicative of the presence of the weather event in the geographic region of interest.

2. The computer implemented method of claim 1, further comprising:
   (f) modifying the content on a webpage viewed by a user to include information related to the weather event.

3. The computer implemented method of claim 2, wherein the modifying of step (e) occurs in response to the weather event occurring in a user specified geographic region.

4. The computer implemented method of claim 2, wherein the content included on the user's webpage is generated automatically.

5. The computer implemented method of claim 1, wherein the queries include zip codes.

6. The computer implemented method of claim 1, wherein the query threshold is determined at least in part by analyzing records of query data related to the average number of queries received over a particular period of time.

7. The computer implemented method of claim 1, wherein the query threshold is determined at least in part by analyzing records of query data related to the average number of queries received pertaining to a particular geographic region.

8. The computer implemented method of claim 1, wherein the query threshold is determined at least in part by analyzing records of query data related to the standard deviation of the number of queries received over a particular period of time.

9. The computer implemented method of claim 1, wherein the query threshold is determined at least in part by analyzing records of query data related to the standard deviation of the number of queries received pertaining to a particular geographic region.

10. The computer implemented method of claim 1, wherein the weather event is a thunderstorm.

11. The computer implemented method of claim 1, wherein the weather event is a windstorm.

12. The computer implemented method of claim 1, wherein the weather event is a tornado.

13. The computer implemented method of claim 1, wherein the weather event is a change in temperature.

14. A computer implemented method of modifying weather content on a webpage, the method comprising:
   (a) monitoring queries to an Internet-based weather information system, wherein the queries contain a request for weather information pertaining to a geographic region of interest;
   (b) determining a query threshold for the geographic region of interest, wherein the query threshold represents a statistically determined number of queries, the receipt of which is indicative of the presence of a weather event;
   (c) determining if the number of queries pertaining to the geographic region is above the query threshold;
   (d) inferring the presence of the weather event in the geographic region of interest if the number of queries pertaining to the geographic region of interest is above the query threshold; and
   (e) modifying the content on a webpage viewed by a user to include information pertaining to the existence of the weather event if the presence of the weather event is inferred.

15. The computer implemented method of claim 14, wherein the queries include zip codes.

16. A computer implemented method of modifying weather content on a webpage, the method comprising:
   (a) monitoring queries to an Internet-based weather information system, wherein the queries contain a request for weather information pertaining to a geographic region of interest;
   (b) determining a query threshold for the one geographic region of interest, wherein the query threshold represents a statistically determined number of queries, the receipt of which is indicative of the presence of a weather event;
   (c) determining if the number of queries pertaining to the geographic region is above the query threshold;
   (d) inferring the presence of the weather event in the geographic region of interest if the number of queries pertaining to the geographic region of interest is above the query threshold;
   (e) generating content relevant to the weather conditions in the geographic region based on the inferring of step (d); and
   (f) modifying the content on a webpage viewed by a user with the content generated in step (e).

17. The computer implemented method of claim 16, wherein the queries include zip codes.

18. A computer-implemented method of generating a signal indicative of the presence of a weather event, the method comprising:

(a) monitoring queries to a weather information system, wherein the queries contain at least a request for weather information pertaining to a geographic region of interest;
(b) determining a query threshold for the geographic region of interest, wherein the query threshold represents a statistically determined number of queries, the receipt of which is indicative of the presence of a weather event;
(c) determining if the number of queries pertaining to the geographic region of interest is above the query threshold;
(d) inferring the presence of the weather event in the geographic region of interest if the number of queries pertaining to the geographic region of interest is above the query threshold; and
(e) generating a signal indicative of the presence of the weather event in the geographic region of interest based on the inferring of step (d).

19. The computer implemented method of claim 18, wherein the query threshold is determined at least in part by analyzing records of query data related to the average number of queries received over a particular period of time.

20. The computer implemented method of claim 18, wherein the query threshold is determined at least in part by analyzing records of query data related to the average number of queries received pertaining to a particular geographic region.

21. The computer implemented method of claim 18, wherein the query threshold is determined at least in part by analyzing records of query data related to the standard deviation of the number of queries received over a particular period of time.

22. The computer implemented method of claim 18, wherein the query threshold is determined at least in part by analyzing records of query data related to the standard deviation of the number of queries received pertaining to a particular geographic region.

* * * * *